US012304345B2

(12) United States Patent
Moravec

(10) Patent No.: US 12,304,345 B2
(45) Date of Patent: May 20, 2025

(54) SYSTEMS AND METHODS FOR IMPROVING INITIAL RANGE PREDICTION WHEN TOWING

(71) Applicants: Hyundai Motor Company, Seoul (KR); Kia Corporation, Seoul (KR)

(72) Inventor: Alexander Moravec, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 202 days.

(21) Appl. No.: 18/177,405

(22) Filed: Mar. 2, 2023

(65) Prior Publication Data

US 2024/0317106 A1    Sep. 26, 2024

(51) Int. Cl.
*B60L 58/12* (2019.01)
*B60W 40/12* (2012.01)
*G07C 5/00* (2006.01)

(52) U.S. Cl.
CPC ............ *B60L 58/12* (2019.02); *B60W 40/12* (2013.01); *G07C 5/004* (2013.01);
(Continued)

(58) Field of Classification Search
CPC .. B60L 58/12; B60L 2200/28; B60L 2240/26; B60L 2240/70; B60L 2250/16; B60L 2260/52; B60L 3/12; B60W 40/12; B60W 50/0097; B60W 50/14; B60W 2050/0026; B60W 2050/146; B60W 2300/14; B60W 2510/242;
(Continued)

(56) References Cited

U.S. PATENT DOCUMENTS

| | | | |
|---|---|---|---|
| 9,834,111 B2 | 12/2017 | Grewal et al. | |
| 11,138,813 B2 | 10/2021 | Bower | |
| 2018/0001788 A1* | 1/2018 | Geuß | ............ B60L 53/50 |

FOREIGN PATENT DOCUMENTS

| | | | | |
|---|---|---|---|---|
| EP | 4026722 A1 * | 7/2022 | ......... | B60L 15/2072 |
| KR | 10-2022-0016693 A | 2/2022 | | |

* cited by examiner

*Primary Examiner* — Alan D Hutchinson
(74) *Attorney, Agent, or Firm* — Fox Rothschild LLP

(57) ABSTRACT

Systems and methods for predicting towing fuel economy are provided. The method may comprise generating a calibration map. The calibration map may correlate a towing fuel economy factor to a ratio of $$\frac{A_{Trailer}}{A_{Vehicle}}$$

versus a ratio of $$\frac{M_{Trailer}}{M_{Vehicle}},$$

and $A_{Trailer}$ is a frontal area of a trailer, $A_{Vehicle}$ is a frontal area of a vehicle, $M_{Trailer}$ is a mass of the trailer, and $M_{Vehicle}$ is a mass of the vehicle. The method may comprise calculating the towing fuel economy factor from the calibration map, calculating a towing range, using the towing fuel economy factor, and calculating a towing distance to empty, using the towing range.

20 Claims, 5 Drawing Sheets

(52) U.S. Cl.
CPC ....... *B60L 2200/28* (2013.01); *B60L 2240/26* (2013.01); *B60L 2240/70* (2013.01); *B60L 2250/16* (2013.01); *B60L 2260/52* (2013.01)

(58) Field of Classification Search
CPC .......... B60W 2530/10; B60W 2530/13; G07C 5/004; B60Y 2200/147
See application file for complete search history.

SYSTEMS AND METHODS FOR IMPROVING INITIAL RANGE PREDICTION WHEN TOWING

BACKGROUND

Technical Field

Embodiments of the present disclosure relate to systems and methods for predicting towing fuel economy prior to movement (e.g., driving) of a tow vehicle.

Background

In North America, private vehicles are commonly purchased for towing. For example, many trucks, SUVs, etc., are purchased for the purpose of towing trailers, campers, boats, etc. Current estimates for towing fuel economy typically rely on trailer mass. However, these estimates of towing fuel economy and range do not account for the aerodynamic effects of towing a trailer.

Currently, tow vehicle users generally have the ability to select a "Tow Mode" in some vehicles, which corresponds to either a single towing fuel economy factor, or one based on trailer mass. These factors can lead to large errors, since both weight and aerodynamics have an impact on the vehicle's fuel economy/range. Additional solutions can estimate the weight and towing fuel economy while driving, but these methods do not aid in the estimation of range before a user would begin their drive, leading to a large amount of range anxiety.

For electric-powered vehicles, logic exists to determine range after a set period of towing by using real time fuel economy data. However, using this logic, a user would not know the range until the user is already driving to a destination, when it is too late to add charge.

Existing internal combustion engine (ICE) vehicles and future electric vehicle (EV) trucks and SUVs will need accurate range predictions to build customer loyalty and grow sales. The North American truck market is very difficult to successfully enter, even with competitive vehicles. Range anxiety is already prevalent for EV users due to gaps in charging networks and the general unfamiliarity with EVs. Inaccurate range prediction while towing may significantly further increase range anxiety.

SUMMARY

According to an object of the present disclosure, a method for predicting towing fuel economy is provided. The method may comprise generating a calibration map. The calibration map may correlate a towing fuel economy factor to a ratio of $$\frac{A_{Trailer}}{A_{Vehicle}}$$

versus a ratio of $$\frac{M_{Trailer}}{M_{Vehicle}},$$

and $A_{Trailer}$ is a frontal area of a trailer, $A_{Vehicle}$ is a frontal area of a vehicle, $M_{Trailer}$ is a mass of the trailer, and $M_{Vehicle}$ is a mass of the vehicle. The method may comprise calculating the towing fuel economy factor from the calibration map, calculating a towing range, using the towing fuel economy factor, and calculating a towing distance to empty, using the towing range.

According to an exemplary embodiment, the method may further comprise, using a graphical user interface of the vehicle, inputting the mass of the trailer and inputting the frontal area of the trailer.

According to an exemplary embodiment, wherein the method may comprise displaying the towing distance to empty on the graphical user interface.

According to an exemplary embodiment, the graphical user interface may comprise an audio, visual, and navigation system.

According to an exemplary embodiment, the calculating the towing range may comprise multiplying a baseline fuel economy by the towing fuel economy factor.

According to an exemplary embodiment, the calculating the towing distance to empty may comprise multiplying a state of charge of a battery of the vehicle by useable battery energy of the vehicle to determine an available battery energy of the vehicle, and multiplying the available battery energy by the towing range to determine the towing distance to empty.

According to an exemplary embodiment, the generating the calibration map may comprise performing a towing fuel economy test with a plurality of trailers and vehicles, and, based on the towing fuel economy test, calculating towing fuel economy factors for each combination of a trailer and a vehicle of the plurality of trailers and vehicles.

According to an object of the present disclosure, a system for predicting towing fuel economy is provided. The system may comprise a vehicle, a memory configured to store a calibration map, and a processor, configured to generate the calibration map. The calibration map may correlate a towing fuel economy factor to a ratio of $$\frac{A_{Trailer}}{A_{Vehicle}}$$

versus a ratio of $$\frac{M_{Trailer}}{M_{Vehicle}},$$

and $A_{Trailer}$ is a frontal area of a trailer, $A_{Vehicle}$ is a frontal area of a vehicle, $M_{Trailer}$ is a mass of the trailer, and $M_{Vehicle}$ is a mass of the vehicle. The processor may further be configured to calculate the towing fuel economy factor from the calibration map, calculate a towing range, using the towing fuel economy factor, and calculate a towing distance to empty, using the towing range.

According to an exemplary embodiment, the system may further comprise a graphical user interface configured to receive input of the mass of the trailer and receive input of the frontal area of the trailer.

According to an exemplary embodiment, the processor may be configured to display the towing distance to empty on the graphical user interface.

According to an exemplary embodiment, the graphical user interface may comprise an audio, visual, and navigation system.

According to an exemplary embodiment, the calculating the towing range may comprise multiplying a baseline fuel economy by the towing fuel economy factor.

According to an exemplary embodiment, the calculating the towing distance to empty may comprise multiplying a state of charge of a battery of the vehicle by useable battery energy of the vehicle to determine an available battery energy of the vehicle, and multiplying the available battery energy by the towing range to determine the towing distance to empty.

According to an exemplary embodiment, the generating the calibration map may comprise performing a towing fuel economy test with a plurality of trailers and vehicles, and, based on the towing fuel economy test, calculating towing fuel economy factors for each combination of a trailer and a vehicle of the plurality of trailers and vehicles.

According to an object of the present disclosure, a system for predicting towing fuel economy is provided. The system may comprise a vehicle and a computing device, comprising a processor and a memory, configured to store programming instructions. The programming instructions, when executed by the processor, may be configured to cause the processor to generate a calibration map. The calibration map may correlate a towing fuel economy factor to a ratio of $$\frac{A_{Trailer}}{A_{Vehicle}}$$

versus a ratio of $$\frac{M_{Trailer}}{M_{Vehicle}},$$

and $A_{Trailer}$ is a frontal area of a trailer, $A_{Vehicle}$ is a frontal area of a vehicle, $M_{Trailer}$ is a mass of the trailer, and $M_{Vehicle}$ is a mass of the vehicle. The programming instructions, when executed by the processor, may be configured to cause the processor to calculate the towing fuel economy factor from the calibration map, calculate a towing range, using the towing fuel economy factor, and calculate a towing distance to empty, using the towing range.

According to an exemplary embodiment, the system may further comprise a graphical user interface configured to receive input of the mass of the trailer and receive input of the frontal area of the trailer.

According to an exemplary embodiment, the programming instructions, when executed by the processor, may be further configured to cause the processor to display the towing distance to empty on the graphical user interface.

According to an exemplary embodiment, the calculating the towing range may comprise multiplying a baseline fuel economy by the towing fuel economy factor.

According to an exemplary embodiment, the calculating the towing distance to empty may comprise multiplying a state of charge of a battery of the vehicle by useable battery energy of the vehicle to determine an available battery energy of the vehicle, and multiplying the available battery energy by the towing range to determine the towing distance to empty.

According to an exemplary embodiment, the generating the calibration map may comprise performing a towing fuel economy test with a plurality of trailers and vehicles, and, based on the towing fuel economy test, calculating towing fuel economy factors for each combination of a trailer and a vehicle of the plurality of trailers and vehicles.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
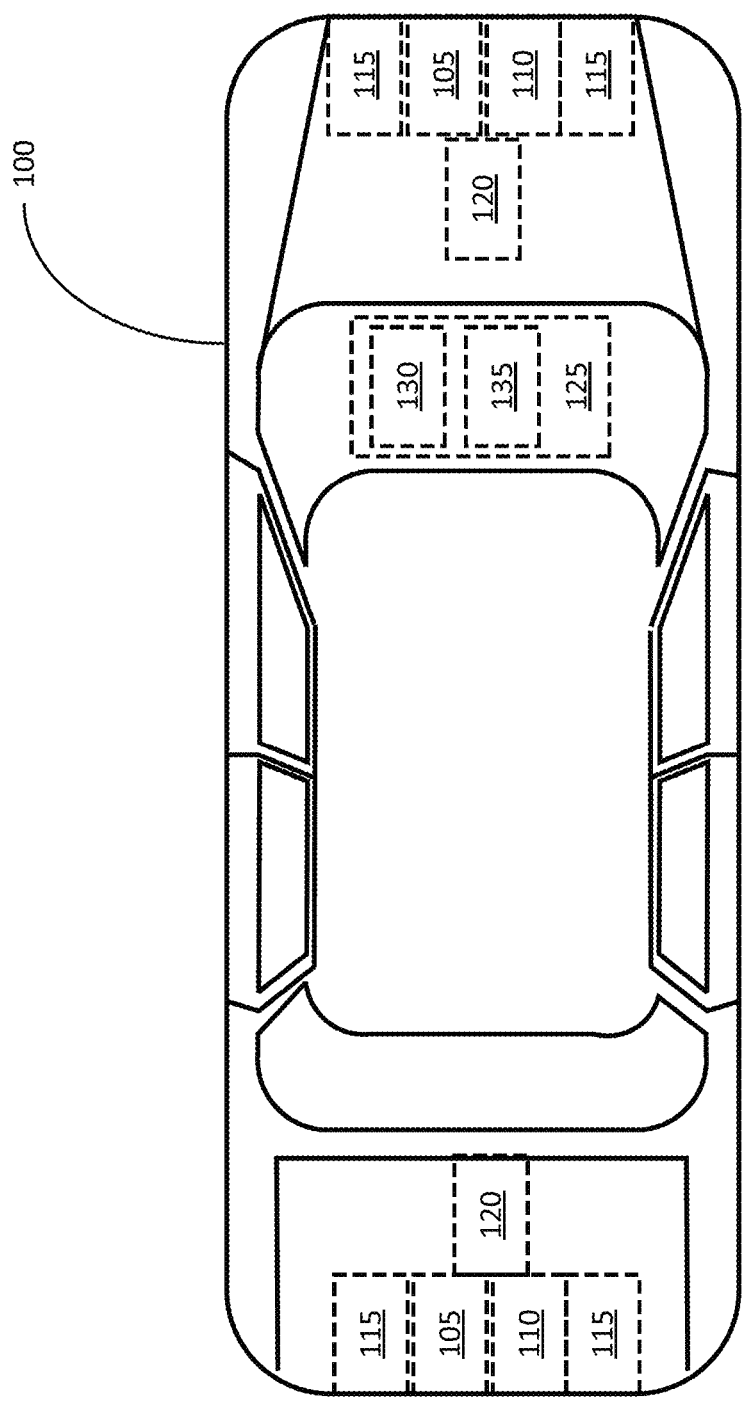
FIG. 1 illustrates an engine system configured to predict towing fuel economy, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

A trailer's aerodynamic properties play a critical role in determining towing fuel economy, especially at highway speeds, when aerodynamic effects are dominant. Due to the complex wake characteristics of air flow behind vehicles, using a trailer's drag coefficient to calculate estimated drag forces is not enough in determining towing fuel economy.

The ratios of trailer properties to vehicle properties need to be used to obtain accurate towing fuel economy factor estimates. For example, ratios of frontal area and mass may be used to yield a close towing fuel economy factor estimate. According to an exemplary embodiment, historical towing data may be used to create a calibration map of a towing fuel economy factor versus $$\frac{A_{Trailer}}{A_{Vehicle}}$$

versus $$\frac{M_{Trailer}}{M_{Vehicle}}$$

to be utilized for estimates of a vehicle's towing Range, where $A_{Trailer}$ is the frontal area of a trailer, $A_{Vehicle}$ is the frontal area of a vehicle, $M_{Trailer}$ is the mass of a trailer, and $M_{Vehicle}$ is the mass of a vehicle. An example calibration map is illustratively depicted in FIG. 3. According to an exemplary embodiment, as more towing data is gathered, the calibration table/map may be updated to increase accuracy.

Referring now to FIG. 1, a vehicle 100 configured to predict towing fuel economy is illustratively depicted, in accordance with an exemplary embodiment of the present disclosure.

According to an exemplary embodiment, the vehicle 100 may comprise one or more sensors such as, for example, one or more LiDAR sensors 105, one or more radio detection and ranging (RADAR) sensors 110, one or more cameras 115, and/or one or more position determining sensors 120 (e.g., one or more Global Positioning System devices), among other suitable sensors. According to an exemplary embodiment, the one or more sensors may be in electronic communication with one or more computing devices 125. The one or more computing devices 125 may be separate from the one or more sensors and/or may be incorporated into the one or more sensors.

According to an exemplary embodiment, the computing device 125 may comprise a processor 130 and/or a memory 135. The memory 135 may be configured to store programming instructions that, when executed by the processor 130, may be configured to cause the processor 130 to perform one or more tasks such as, e.g., generating a calibration map, receiving vehicle and trailer mass and area inputs from a user, receiving and/or implementing mode of operation instructions (e.g., drive mode, tow mode, trailer mode, etc.), interpreting fuel economy factors, calculating towing ranges, and/or calculating and updating towing distances to empty, among other functions.

Figure 2:
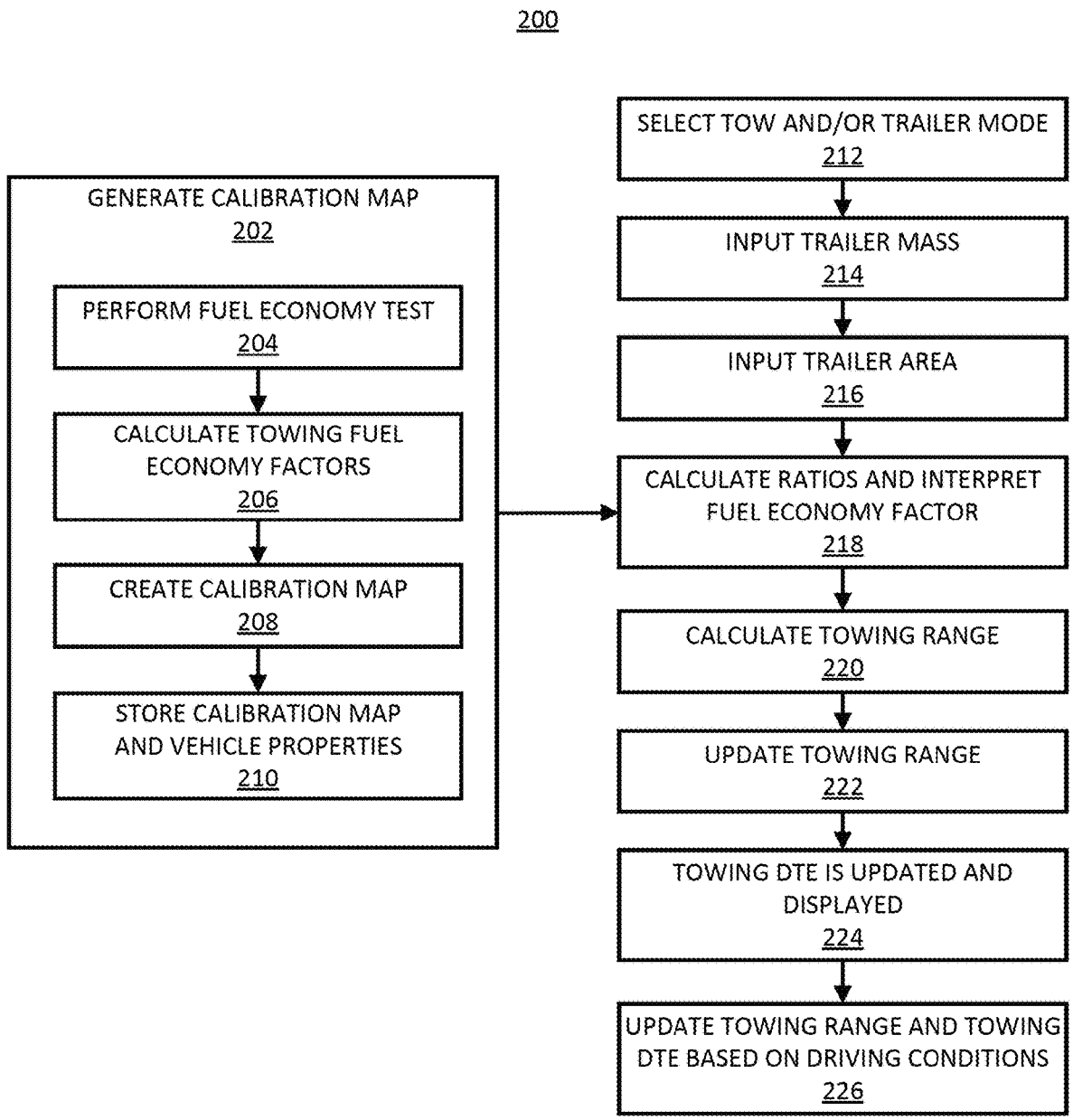
FIG. 2 illustrates a method for predicting towing fuel economy, according to an exemplary embodiment of the present disclosure.

Referring now to FIG. 2, a method 200 for predicting towing fuel economy is illustratively depicted, in accordance with an exemplary embodiment of the present disclosure.

According to an exemplary embodiment, the method may utilize ratios of both a trailer's frontal area and mass and a vehicle's frontal area and mass in order to predict towing fuel economy.

According to an exemplary embodiment, historical tow test data may be used to calculate characteristic ratios and towing fuel economy factors for a given combination of a trailer and vehicle. For example, historical test data for a vehicle used in a tow test, with an $A_{Vehicle}$ of 2.5 m² and an $A_{Trailer}$ of 2,600 kg is shown in Table 1.

TABLE 1

|  | | Trailer | | | | | |
|---|---|---|---|---|---|---|---|
|  | Baseline | Jet Ski | Small Box | Offroad | Dual Jet Ski | Tear Drop | Medium Box |
| $\dfrac{A_{Trailer}}{A_{Vehicle}}$ | 0 | 0.2496 | 0.7802 | 0.9136 | 0.4797 | 1.343 | 1.309 |
| $\dfrac{M_{Trailer}}{M_{Vehicle}}$ | 0 | 0.1821 | 0.3537 | 0.3981 | 0.3981 | 0.4016 | 0.6191 |
| Actual Fuel Economy Factor | 1 | 0.6500 | 0.5742 | 0.4385 | 0.5315 | 0.4066 | 0.4393 |

According to an exemplary embodiment, a correlation may be derived between a towing fuel economy factor, $$\frac{A_{Trailer}}{A_{Vehicle}},$$

and $$\frac{M_{Trailer}}{M_{Vehicle}}.$$

According to an exemplary embodiment, characteristic ratios may normalize the trailer and vehicle properties to be used across a variety of vehicle and trailer types.

At 202, a calibration map is generated. According to an exemplary embodiment, generating the calibration map may comprise, at 204, performing a towing fuel economy test with a variety of trailers and/or vehicles. Based on the towing fuel economy test, towing fuel economy factors, at 206, may be calculated for each combination of trailer and vehicle. According to an exemplary embodiment, at 208, a calibration map may be created for a towing fuel economy factor versus $$\frac{A_{Trailer}}{A_{Vehicle}}$$

versus $$\frac{M_{Trailer}}{M_{Vehicle}}$$

to be utilized for estimates of a vehicle's towing Range. According to an exemplary embodiment, at 210, the calibration map and any vehicle properties may be stored in a computing device such as, e.g., a vehicle control unit (VCU). The VCU may comprise, or be a component of, a computing device such as computing device 125 of FIG. 1.

According to an exemplary embodiment, a towing vehicle may be one or more modes of operation such as, e.g., a drive mode, a tow mode, and/or other suitable modes of operation. At 212, a towing vehicle user selects a tow mode for the vehicle.

According to an exemplary embodiment, the towing vehicle may comprise an audio, visual, and navigation (AVN) system. According to an exemplary embodiment, the AVN system may comprise a graphical user interface configured to convey information to one or more users and/or may be configured to enable the one or more users to input one or more commands and/or bits of data into the AVN system.

According to an exemplary embodiment, a user may select a tow and/or trailer mode in using the AVN system, may click a tow and/or trailer mode using a hard button, and/or may select a tow and/or trailer mode using one or more other suitable means. According to an exemplary embodiment, upon entering the tow and/or trailer mode, the user may be prompted to input additional information. The user may be prompted immediately after selecting the tow and/or trailer mode and/or within another suitable timeframe. According to an exemplary embodiment, once the tow and/or trailer mode is selected, the AVN system may prompt the user, at 214, to input a trailer mass and/or weight and/or, at 216, input a trailer area.

The trailer mass and/or weight may be manually input and/or may be selected from one or more possible selections. For example, the user may be prompted to select a trailer weight from a series of trailer weight ranges. Trailer weight ranges may comprise, for example, "light" (0-2,000 lbs), "medium" (2,000-4,000 lbs), "large" (4,000-6,000 lbs), and "extra large" (6,000-8,000 lbs). It is noted, however, that other weight and/or mass ranges may be incorporated, while maintaining the spirit and functionality of the present disclosure.

The trailer area may be manually input, may be calculated based on one or more selected and/or manually input trailer dimensions, and/or may be selected from one or more possible selections. It is noted, however, that other means of determining a trailer area may be incorporated, while maintaining the spirit and functionality of the present disclosure.

Figure 3:
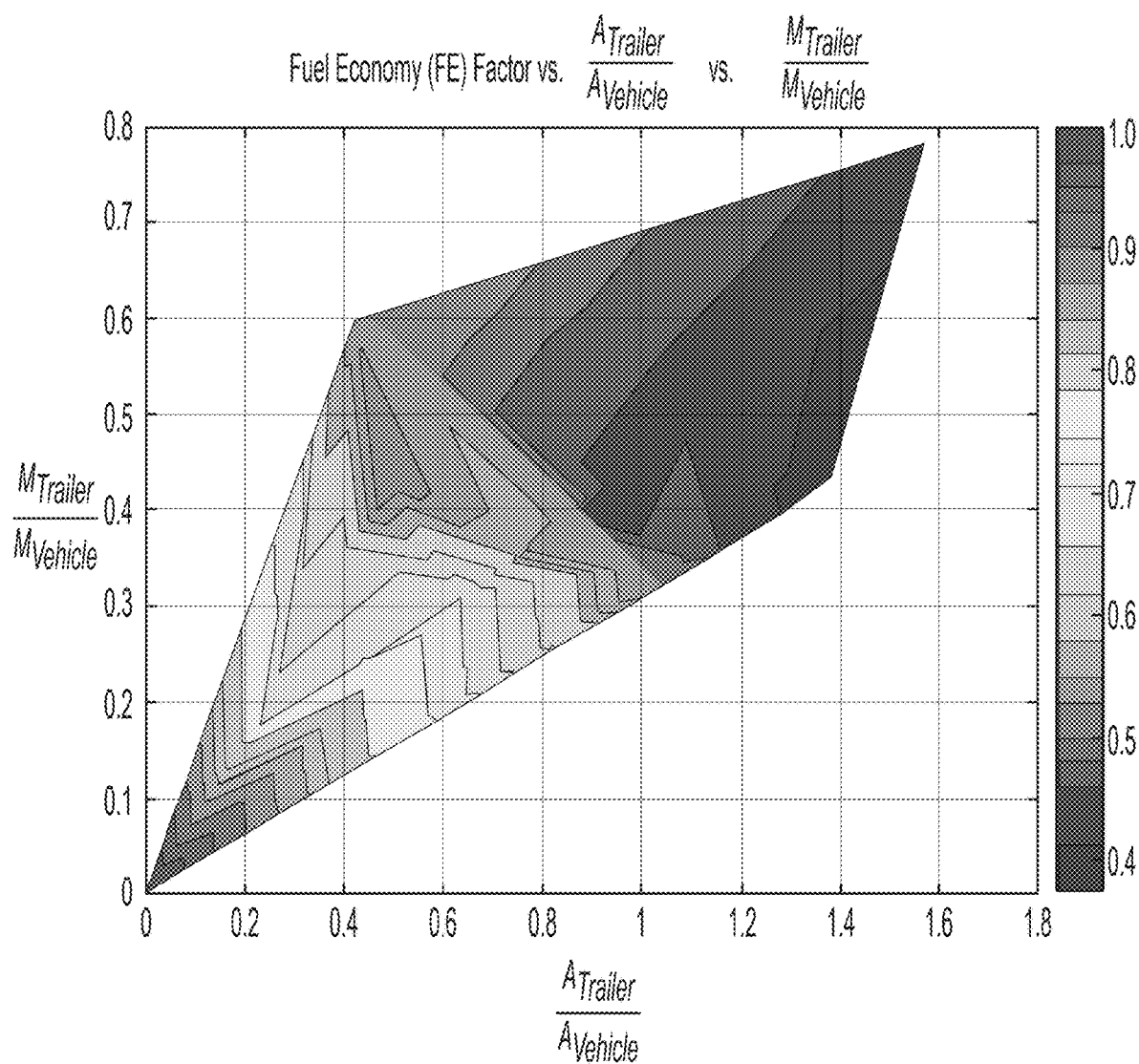
FIG. 3 illustrates an example graphical representation of a calibration map, according to an exemplary embodiment of the present disclosure.

According to an exemplary embodiment, the VCU, at 218, may calculate one or more ratios (e.g., $$\frac{A_{Trailer}}{A_{Vehicle}}, \frac{M_{Trailer}}{M_{Vehicle}},$$

etc.) and/or may interpolate one or more fuel economy factors from, e.g., the calibration map such as, e.g., the map shown in FIG. 3. According to an exemplary embodiment, at 220, the VCU may calculate a towing range using the one or more fuel economy factors and/or one or more other suitable factors. According to an exemplary embodiment, calculating the towing range may comprise multiplying a baseline fuel economy by the towing fuel economy factor.

Based on the towing range, the towing range, at 222, may be updated in the VCU. Based on the towing range, the towing distance to empty (DTE), at 224, may be calculated and updated and displayed on the AVN system. According to an exemplary embodiment, a state of charge of a battery of an electric vehicle may be multiplied by the useable battery energy of the electric vehicle in order to determine an available battery energy of the electric vehicle. The available battery energy may be multiplied by the towing range in order to determine the towing DTE. It is noted, however, that other means of generating the towing DTE may be incorporated, while maintaining the spirit and functionality of the present disclosure.

According to an exemplary embodiment, the towing DTE may be updated prior to driving the towing vehicle, enabling the user of the towing vehicle to receive the towing DTE prior to moving the trailer. According to an exemplary embodiment, the AVN system may present, to the user, that the towing range and/or the towing DTE are initial estimates. The VCU, at 226, may update the estimated towing range and/or towing DTE based on driving factors such as, e.g., road grade, trailer type, weather conditions, speed, acceleration, and/or one or more other driving factors.

Figure 4:
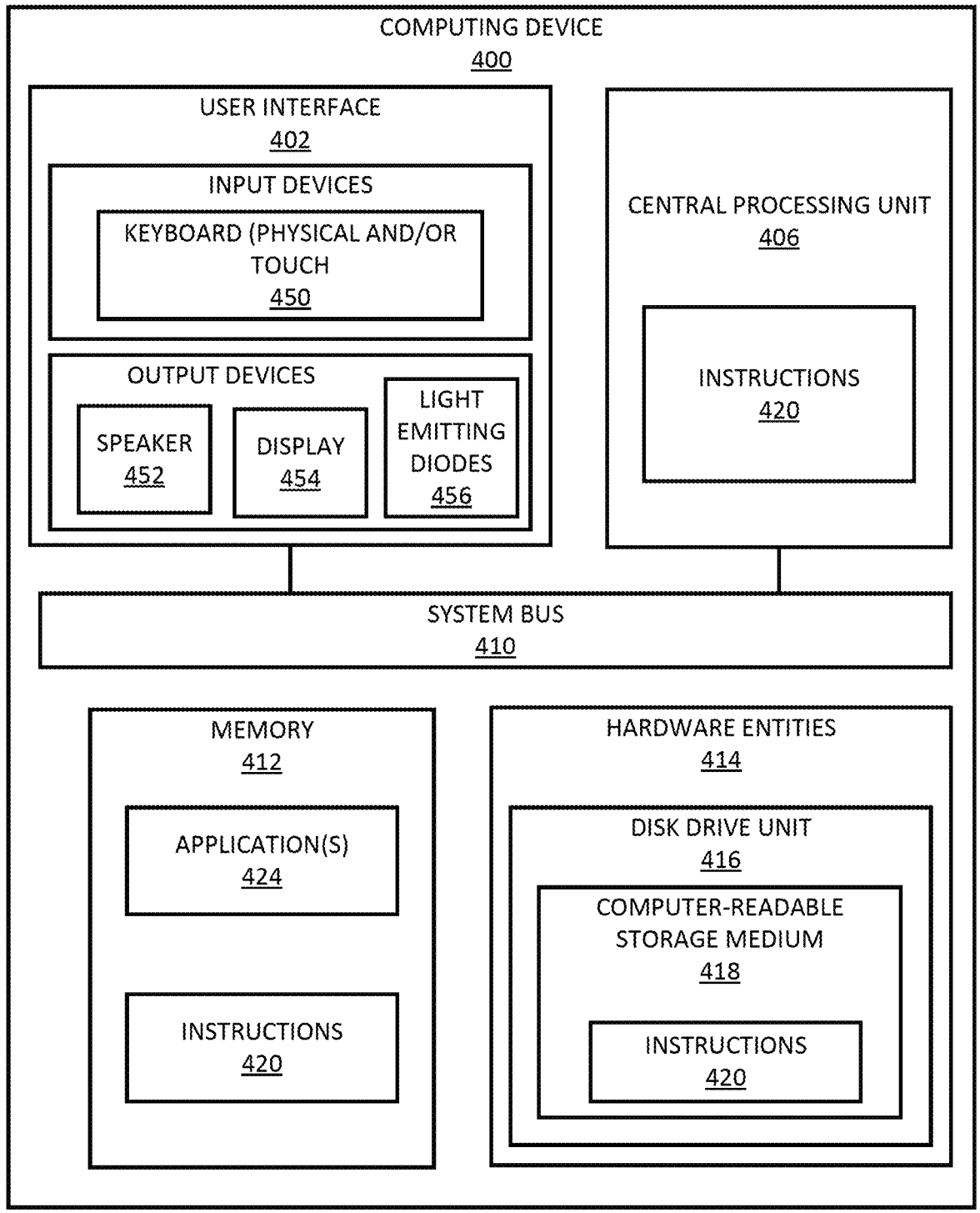
FIG. 4 illustrates example elements of a computing device, according to an exemplary embodiment of the present disclosure.

Referring now to FIG. 4, an illustration of an example architecture for a computing device 400 is provided. According to an exemplary embodiment, one or more functions of the present disclosure may be implemented by a computing device such as, e.g., computing device 400 or a computing device similar to computing device 400.

The hardware architecture of FIG. 4 represents one example implementation of a representative computing device configured to perform one or more methods and means for reducing engine-out emissions during an engine cold start, as described herein. As such, the computing device 400 of FIG. 4 may be configured to implement at least a portion of the method(s) described herein (e.g., method 200 of FIG. 2) and/or implement at least a portion of the functions of the system(s) described herein (e.g., vehicle 100 of FIG. 1). According to an exemplary embodiment, computing device 125 of FIG. 1 may be a component of, or an example of, computing device 400.

Some or all components of the computing device 400 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 4, the computing device 400 may comprise a user interface 402, a Central Processing Unit ("CPU") 406, a system bus 410, a memory 412 connected to and accessible by other portions of computing device 400 through system bus 410, and hardware entities 414 connected to system bus 410. The user interface may comprise input devices and output devices, which may be configured to facilitate user-software interactions for controlling operations of the computing device 400. The input devices may comprise, but are not limited to, a physical and/or touch keyboard 440. The input devices may be connected to the computing device 400 via a wired or wireless connection (e.g., a Bluetooth® connection). The output devices may comprise, but are not limited to, a speaker 442, a display 444, and/or light emitting diodes 446.

At least some of the hardware entities 414 may be configured to perform actions involving access to and use of memory 412, which may be a Random Access Memory (RAM), a disk driver and/or a Compact Disc Read Only Memory (CD-ROM), among other suitable memory types. Hardware entities 414 may comprise a disk drive unit 416 comprising a computer-readable storage medium 418 on which may be stored one or more sets of instructions 420 (e.g., programming instructions such as, but not limited to, software code) configured to implement one or more of the methodologies, procedures, or functions described herein. The instructions 420 may also reside, completely or at least partially, within the memory 412 and/or within the CPU 406 during execution thereof by the computing device 400.

The memory 412 and the CPU 406 may also constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
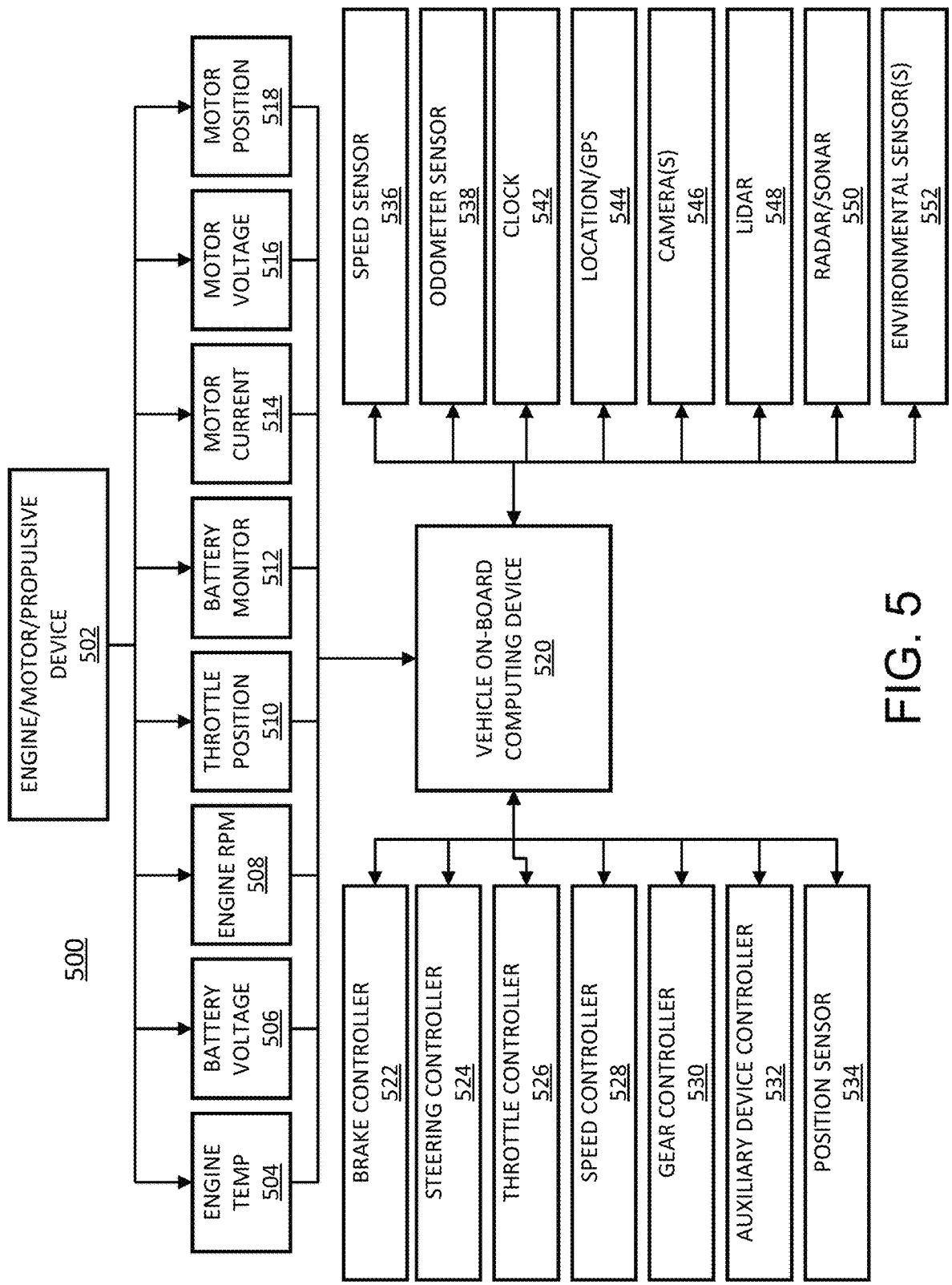
FIG. 5 illustrates an example architecture of a vehicle, according to an exemplary embodiment of the present disclosure.

Referring now to FIG. 5, an example vehicle system architecture 500 for a vehicle is provided, in accordance with an exemplary embodiment of the present disclosure.

Vehicle 100 may have the same or similar system architecture as that shown in FIG. 5. Thus, the following discussion of vehicle system architecture 500 is sufficient for understanding one or more components of a vehicle with which vehicle 100 may be incorporated.

As shown in FIG. 5, the vehicle system architecture 500 may comprise an engine, motor or propulsive device (e.g., a thruster) 502 and various sensors 504-518 for measuring various parameters of the vehicle system architecture 500. In gas-powered or hybrid vehicles having a fuel-powered engine, the sensors 504-518 may comprise, for example, an engine temperature sensor 504, a battery voltage sensor 506, an engine Rotations Per Minute (RPM) sensor 508, and/or a throttle position sensor 510. If the vehicle is an electric or hybrid vehicle, then the vehicle may comprise an electric motor, and accordingly may comprise sensors such as a battery monitoring system 512 (to measure current, voltage and/or temperature of the battery), motor current 514 and voltage 516 sensors, and motor position sensors such as resolvers and encoders 518.

Operational parameter sensors that are common to both types of vehicles may comprise, for example: a position sensor 534 such as an accelerometer, gyroscope and/or inertial measurement unit; a speed sensor 536; and/or an odometer sensor 538. The vehicle system architecture 500 also may comprise a clock 542 that the system uses to determine vehicle time and/or date during operation. The clock 542 may be encoded into the vehicle on-board computing device 520, it may be a separate device, or multiple clocks may be available.

The vehicle system architecture 500 also may comprise various sensors that operate to gather information about the environment in which the vehicle is traveling. These sensors may comprise, for example: a location sensor 544 (for example, a Global Positioning System (GPS) device); object detection sensors such as one or more cameras 546; a LiDAR sensor system 548; and/or a RADAR and/or a sonar system 550. The sensors also may comprise environmental sensors 552 such as, e.g., a humidity sensor, a precipitation sensor, a light sensor, and/or ambient temperature sensor. The object detection sensors may be configured to enable the vehicle system architecture 500 to detect objects that are within a given distance range of the vehicle in any direction, while the environmental sensors 552 may be configured to collect data about environmental conditions within the vehicle's area of travel. According to an exemplary embodiment, the vehicle system architecture 500 may comprise one or more lights 554 (e.g., headlights, flood lights, flashlights, etc.).

During operations, information may be communicated from the sensors to an on-board computing device 520 (e.g., computing devices 100 of FIG. 1 and 400 of FIG. 4). The on-board computing device 520 may be configured to analyze the data captured by the sensors and/or data received from data providers and may be configured to optionally control operations of the vehicle system architecture 500 based on results of the analysis. For example, the on-board computing device 520 may be configured to control: braking via a brake controller 522; direction via a steering controller 524; speed and acceleration via a throttle controller 526 (in a gas-powered vehicle) or a motor speed controller 528 (such as a current level controller in an electric vehicle): a differential gear controller 530 (in vehicles with transmissions); and/or other controllers. The brake controller 522 may comprise a pedal effort sensor, pedal effort sensor, and/or simulator temperature sensor, as described herein.

Geographic location information may be communicated from the location sensor 544 to the on-board computing device 520, which may then access a map of the environment that corresponds to the location information to determine known fixed features of the environment such as streets, buildings, stop signs and/or stop/go signals. Captured images from the cameras 546 and/or object detection information captured from sensors such as LiDAR 548 may be communicated from those sensors to the on-board computing device 520. The object detection information and/or captured images may be processed by the on-board computing device 520 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method for predicting towing fuel economy, comprising:
   generating a calibration map,
      wherein:
         the calibration map correlates a towing fuel economy factor to a ratio of $$\frac{A_{Trailer}}{A_{Vehicle}}$$

versus a ratio of $$\frac{M_{Trailer}}{M_{Vehicle}},$$

and
   $A_{Trailer}$ is a frontal area of a trailer, $A_{Vehicle}$ is a frontal area of a vehicle,
   $M_{Trailer}$ is a mass of the trailer, and $M_{Vehicle}$ is a mass of the vehicle;
calculating the towing fuel economy factor from the calibration map;
calculating a towing range, using the towing fuel economy factor; and
calculating a towing distance to empty, using the towing range.

2. The method of claim 1, further comprising:
using a graphical user interface of the vehicle:
inputting the mass of the trailer; and
inputting the frontal area of the trailer.

3. The method of claim 1, further comprising displaying the towing distance to empty on a graphical user interface.

4. The method of claim 1, wherein a graphical user interface comprises an audio, visual, and navigation system.

5. The method of claim 1, wherein the calculating the towing range comprises multiplying a baseline fuel economy by the towing fuel economy factor.

6. The method of claim 1, wherein the calculating the towing distance to empty comprises:
multiplying a state of charge of a battery of the vehicle by useable battery energy of the vehicle to determine an available battery energy of the vehicle; and
multiplying the available battery energy by the towing range to determine the towing distance to empty.

7. The method of claim 1, wherein the generating the calibration map comprises:
performing a towing fuel economy test with a plurality of trailers and vehicles; and
based on the towing fuel economy test, calculating towing fuel economy factors for each combination of a trailer and a vehicle of the plurality of trailers and vehicles.

8. A system for predicting towing fuel economy, comprising:
a vehicle;
a memory configured to store a calibration map; and
a processor, configured to:
generate the calibration map,
wherein:
the calibration map correlates a towing fuel economy factor to a ratio of $$\frac{A_{Trailer}}{A_{Vehicle}}$$

versus a ratio of $$\frac{M_{Trailer}}{M_{Vehicle}},$$

$A_{Trailer}$ is a frontal area of a trailer, $A_{Vehicle}$ is a frontal area of a vehicle, $M_{Trailer}$ is a mass of the trailer, and $M_{Vehicle}$ is a mass of the vehicle;
calculate the towing fuel economy factor from the calibration map;
calculate a towing range, using the towing fuel economy factor; and
calculate a towing distance to empty, using the towing range.

9. The system of claim 8, further comprising a graphical user interface,
wherein the graphical user interface is configured to:
receive input of the mass of the trailer; and
receive input of the frontal area of the trailer.

10. The system of claim 9, wherein the processor is configured to display the towing distance to empty on the graphical user interface.

11. The system of claim 10, wherein the graphical user interface comprises an audio, visual, and navigation system.

12. The system of claim 8, wherein the calculating the towing range comprises multiplying a baseline fuel economy by the towing fuel economy factor.

13. The system of claim 8, wherein the calculating the towing distance to empty comprises:
multiplying a state of charge of a battery of the vehicle by useable battery energy of the vehicle to determine an available battery energy of the vehicle; and
multiplying the available battery energy by the towing range to determine the towing distance to empty.

14. The system of claim 8, wherein the generating the calibration map comprises:
performing a towing fuel economy test with a plurality of trailers and vehicles; and
based on the towing fuel economy test, calculating towing fuel economy factors for each combination of a trailer and a vehicle of the plurality of trailers and vehicles.

15. A system for predicting towing fuel economy, comprising:
a vehicle; and
a computing device, comprising a processor and a memory, configured to store programming instructions that, when executed by the processor, cause the processor to:
generate a calibration map,
wherein:
the calibration map correlates a towing fuel economy factor to a ratio of $$\frac{A_{Trailer}}{A_{Vehicle}}$$

versus a ratio of $$\frac{M_{Trailer}}{M_{Vehicle}},$$

$A_{Trailer}$ is a frontal area of a trailer, $A_{Vehicle}$ is a frontal area of a vehicle, $M_{Trailer}$ is a mass of the trailer, and $M_{Vehicle}$ is a mass of the vehicle;
calculate the towing fuel economy factor from the calibration map;
calculate a towing range, using the towing fuel economy factor; and
calculate a towing distance to empty, using the towing range.

16. The system of claim 15, further comprising a graphical user interface,
wherein the graphical user interface is configured to:
receive input of the mass of the trailer; and
receive input of the frontal area of the trailer.

17. The system of claim 16, wherein the programming instructions, when executed by the processor, are further configured to cause the processor to display the towing distance to empty on the graphical user interface.

18. The system of claim 15, wherein the calculating the towing range comprises multiplying a baseline fuel economy by the towing fuel economy factor.

19. The system of claim 15, wherein the calculating the towing distance to empty comprises:
multiplying a state of charge of a battery of the vehicle by useable battery energy of the vehicle to determine an available battery energy of the vehicle; and multiplying the available battery energy by the towing range to determine the towing distance to empty.

20. The system of claim 15, wherein the generating the calibration map comprises:

performing a towing fuel economy test with a plurality of trailers and vehicles; and based on the towing fuel economy test, calculating towing fuel economy factors for each combination of a trailer and a vehicle of the plurality of trailers and vehicles.

* * * * *